FIG. I

INVENTOR.
CARL E. BRICKER

INVENTOR.
CARL E. BRICKER
BY
R. L. Miller
ATTORNEY

Oct. 11, 1955 C. E. BRICKER 2,720,286
AUXILIARY PISTON TYPE CENTER CARRIER DISC BRAKE
Filed Nov. 16, 1951 3 Sheets-Sheet 3

INVENTOR.
CARL E. BRICKER
BY
R. L. Miller
ATTORNEY

2,720,286

AUXILIARY PISTON TYPE CENTER CARRIER DISC BRAKE

Carl E. Bricker, Akron, Ohio, assignor, by mesne assignments, to The Goodyear Tire & Rubber Company, a corporation of Ohio Application November 16, 1951, Serial No. 256,743

14 Claims. (Cl. 188—72)

This invention relates to disc brakes, and particularly to the spot type of double or triple disc brakes wherein at least one center carrier is provided for positioning some of the brake linings.

Heretofore in disc brakes of the class described, it has been customary to mount the center lining carrier or plate for lateral movement on spline or pin means when braking pressure is set up in the brake. However, when braking forces are applied to radially outer portions of the center carrier, a twisting couple is set up on the center carrier. Such twisting couple tends to cause the carrier to bind on its positioning means so that it does not move laterally freely and properly to compensate and adjust for brake action and break wear. Hence the linings on the carrier plate are often worn in a tapered or wedge shape and full utilization of the brake lining thickness is prevented.

The general object of the present invention is to provide a novel type of a multiple disc brake unit which is characterized by the even wear of brake lining means on the center carrier plate or plates.

Another object of the invention is to provide an automatic operating auxiliary piston in a multiple disc type of a brake for initiating movement of the center carrier plate of the brake prior to or simultaneously with the generation of a braking force upon brake actuation.

Yet another object of the invention is to provide a relatively simple, inexpensive, positive acting device for providing a movement force upon a center carrier plate of a brake adjacent its point or points of sliding support for moving the plate along the axis of the brake and maintaining the plate in a position substantially normal to the axis of the brake upon brake actuation.

Yet another object of the invention is to provide means in a multiple disc brake for moving a plurality of center carriers therein in a direction parallel to the axis of the brake.

A further object of the invention is to produce a brake wherein the brake lining or linings carried by a center carrier plate are worn off evenly with use of the brake.

The foregoing and other objects and advantages of the invention will be made more apparent as the specification proceeds.

For a better understanding of the invention, reference should be had to the accompanying drawings wherein certain best known embodiments of the invention are shown, and wherein.

The present invention, broadly speaking, relates to the provision of a brake including a brake housing, a center carrier plate, brake lining means on opposed faces of the carrier plate and being movable therewith, spline or pin means slidably securing the carrier plate to the brake housing, brake discs positioned on opposite sides of the carrier plate and splined to a wheel for rotation therewith, hydraulic pressure means for forcing the brake discs and carrier plate together, and an auxiliary piston member for engaging the carrier plate near its point of support to move it in braking direction upon actuation of the hydraulic pressure means.

Figure 1:
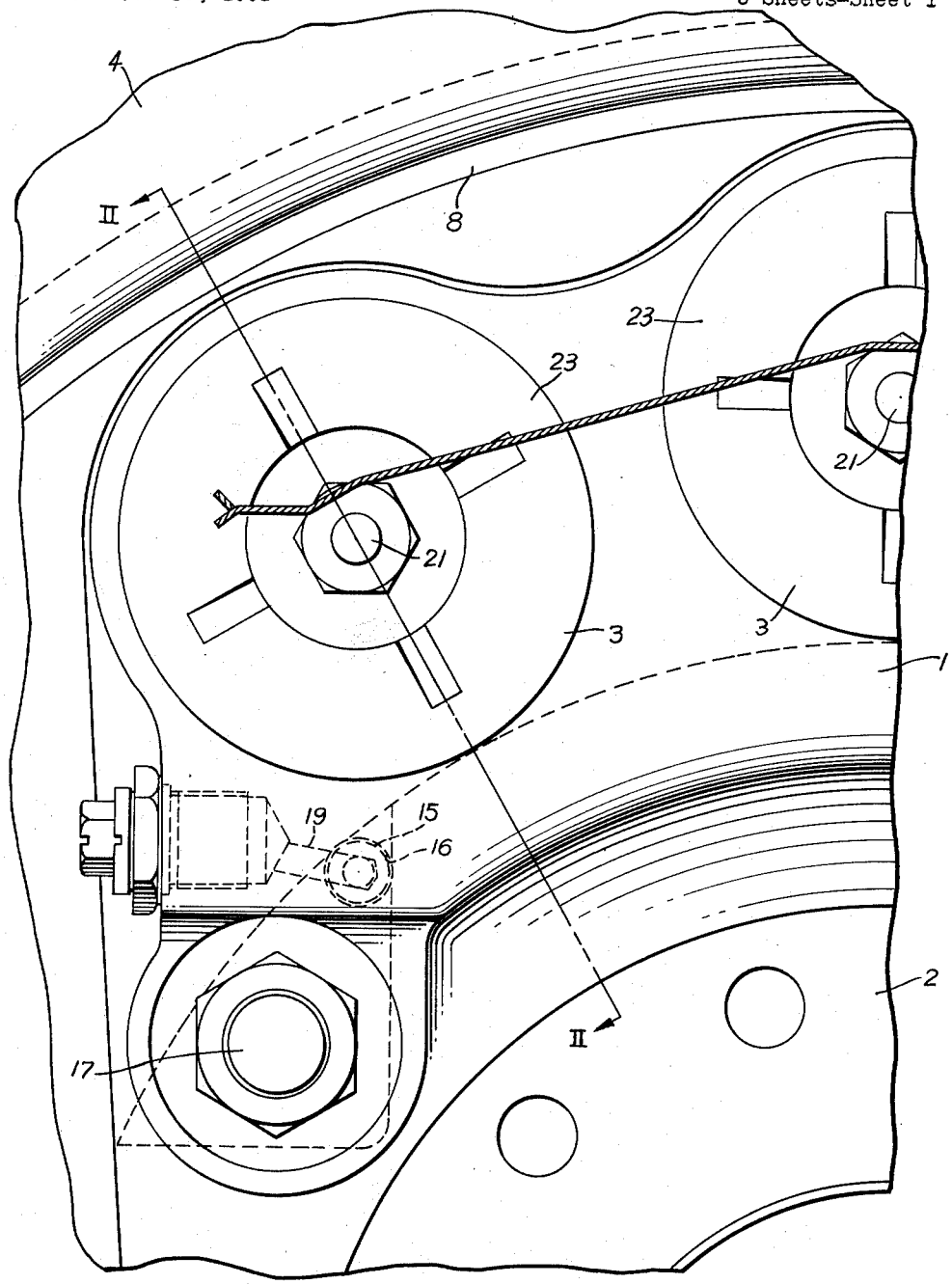
Fig. 1 is a fragmentary side elevation of a brake embodying the principles of the invention.
Figure 2:
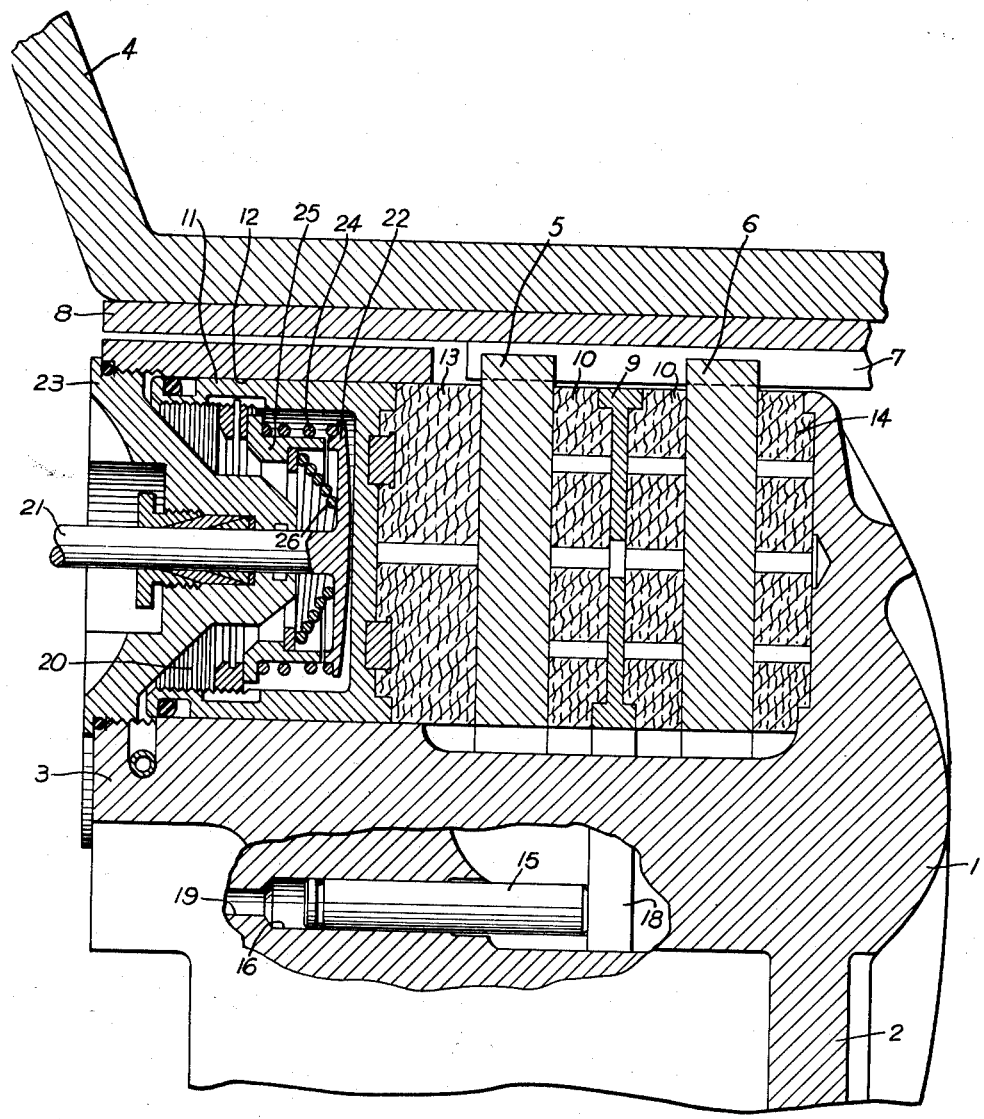
Fig. 2 is a vertical section taken on line II—II of Fig. 1 with a portion of the brake being broken away to show the auxiliary piston of the brake of the invention.

In the accompanying drawings, the improved brake of the invention is the spot pressure, multiple-disc type, meaning that friction material, usually round, is applied against only an arcuately small area of each disc. The brake includes a housing 1 adapted to be suitably secured by a flange 2 to an axle or other support means, such as the undercarriage of an airplane, to be retained in a fixed position thereby. The brake housing is provided with one or more cylindrical portions 3 in which the spot type hydraulic pressure means to be described hereinafter in more detail are located. The brake of the invention is shown in Fig. 2 in association with an aircraft or other wheel 4 which has a pair of brake discs 5 and 6 secured thereto and rotatable therewith by means of axially extending splines 7 or similar means provided on the radially inner surface of the wheel 4 or on a special liner sleeve 8 provided therefor.

In the type of a brake illustrated herein, a center carrier plate 9 is conventionally positioned intermediate the pair of brake discs 5 and 6, and such center carrier plate 9 carries suitable brake linings 10, usually in the form of round blocks, on opposed faces thereof for engagement with adjacent face surfaces of the brake discs 5 and 6.

A conventional brake actuating piston 11 is slidably received in a cylindrical bore 12 provided in the brake housing portion 3 and a brake lining block, usually round, 13 is suitably secured to the face of the piston 11. Conventional means are provided for actuating this piston 11 and such actuation forces the brake block 13 against the adjacent face of the brake disc 5 and in turn moves it axially until such movement of the brake disc 5 brings it against the brake lining 10 on the adjacent face of the carrier plate 9 and moves the carrier plate until the brake lining 10 on the remote face thereof contacts the remaining brake disc 6. This brake disc 6 is then moved axially and brought into contact with a further brake lining block 14 suitably positioned in the brake housing portion 3 on the interior thereof in alignment with the bore 12. Hence all of the brake lining means of the invention are brought into engagement with the brake discs 5 and 6 to effect the desired braking action thereon by movement of the piston 11.

As an important feature of the invention, an auxiliary piston 15 is slidably carried in a bore 16 provided in a portion 3 of the brake housing parallel to the bore 12 at a radially inner portion of the brake, and at a point adjacent each of the splined or pin supports of the carrier plate 9. Bolts 17, or equivalent means are provided which engage with circumferentially spaced portions of the center carrier plate 9 to support the plate in any desired manner for axially sliding but non-rotary movement. The center carrier plate 9 usually has one or more radially inwardly extending lugs 18 provided thereon which have suitable sliding engagement with the bolts 17. The lugs 18 also extend to a point in alignment with the bore 16 so that the auxiliary pistons 15 can contact a radially inner part of the carrier plate through such lug or lugs 18 when the auxiliary pistons 15 are actuated. A hydraulic supply bore 19 connects to the pressure supply end of the bores 16 and it connects to the conventional hydraulic pressure fluid chamber 20 provided in the brake housing for supply of braking pressure to the brake actuation means used in the brake of the invention.

The brake actuation means are of known construction and include a retainer pin 21 which is associated with the braking means and determines the inoperative position of the piston 11. This retainer pin 21 positions a disc 22 at the axially inner end thereof in the bore 12 that has a closure plug 23 to form an operating pressure chamber from the bore 12. The disc 22, through a restraining spring 24, engages a positioning collar 25 that in turn is suitably engaged with and has a limited axial movement with relation to a rear portion of the piston 11. A second control or restraining spring 26 normally also is received within the collar 25 and engages the disc 22 so that the springs 24 and 26 combine to move the collar 25 and piston 11 axially outwardly of the brake 1 when the braking force applied to the piston 11 is removed to provide operative clearance in the brake. Such return movement of the collar 25 results in a slight axial withdrawal of the piston 11 to give the brake of the invention operating clearance. Accordingly, when hydraulic braking forces are set up within the fluid chamber 20, such hydraulic pressure must initially overcome the action of the restraining springs 24 and 26 before braking action results. Also, an initial movement of the piston 11 is required to eliminate the operative clearance in the brake prior to the setting up of braking forces therein.

Inasmuch as the auxiliary piston 15 is immediately energized as soon as braking forces are set up in the brake of the invention, such force applied to the center portion of the center carrier plate 9 prior to the application of any braking forces to same will greatly facilitate movement of the center carrier plate and maintenance of same in a plane normal to the central axis of the brake. By maintaing the center carrier plate normal to the transverse axis of the brake, uniform wear of the different brake-lining means or blocks used in the brake of the invention is achieved so that maximum efficiency and economy of use of the brake lining means is provided in the brake and a smooth-acting, easily movable center carrier plate results.

Figure 3:
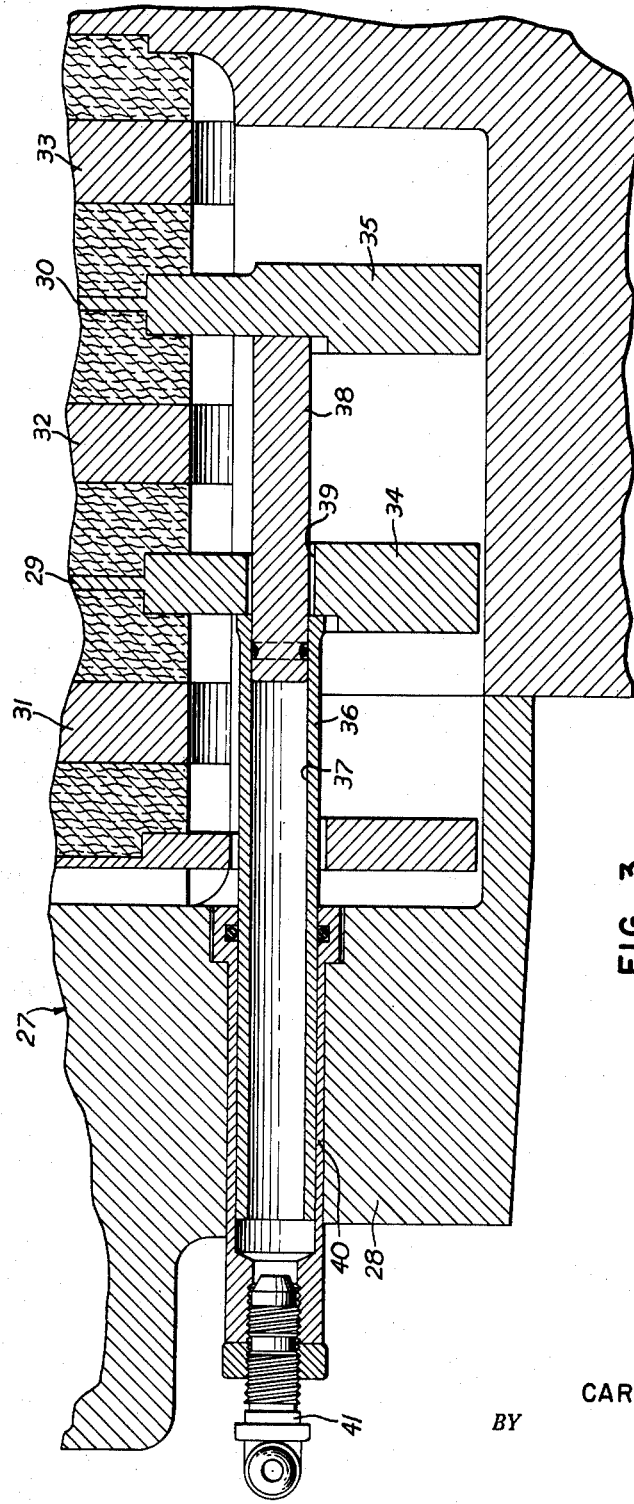
Fig. 3 is a fragmentary section, similar to Fig. 2, showing a special piston of the invention for controlling two carrier plates in a multiple disc brake.

In a modification of the brake of the invention, a triple disc brake 27 is shown in Fig. 3 of the drawings and it includes a brake housing 28 which slidably positions or receives a pair of center brake carrier plates 29 and 30 therein. Three brake discs 31, 32 and 33 are in turn engaged with a suitable wheel (not shown) and such brake discs and carrier plates are free for movement axially of the brake upon brake application, in a manner similar to the brake previously described herein. The general construction and arrangement of the brake 27 is similar to that of the brake 1 and brake application forces are applied thereto in a manner similar to that described hereinbefore. The brake carrier plates 29 and 30 usually have radially inwardly extending offset lug portions 34 and 35 provided thereon, for a purpose to be described hereinafter.

Fig. 3 of the drawings clearly shows that a compound auxiliary piston, including a tubular piston 36 having a bore 37 in which a solid cylindrical piston 38 is slidably received, is provided for aiding movement of the center carrier plates. The drawing shows that the end of the tubular piston 36 abuts upon the lug 34 adjacent a hole or aperture 39 provided therein through which the cylindrical piston 38 extends to abut upon the lug 35 of the carrier plate 30. The tubular piston 36 is suitably and slidably positioned in an insert sleeve 40 engaged with the brake housing 28 in a conventional manner. Conventional packing means are positioned intermediate the tubular piston 36 and the insert sleeve 40 and between the cylindrical piston 38 and the bore 37 to seal the components of such piston with relation to each other and with relation to the sleeve 40. It should be noted that the effective operative areas of both the tubular piston 36 and the cylindrical piston 38 are equal so that equal forces are applied to such different pistons to effect movement of the center carrier plates 29 and 30 upon application of braking pressure to the brake 27. Conventional fitting means 41 connect to the end of the insert sleeve 40 whereby hydraulic fluid can be supplied to the compound auxiliary piston from the brake actuation system of the vehicle to which the brake 27 is secured. Thus the tubular piston 36 and cylindrical piston 38 are actuated or energized with the regular brake of the invention and movement of such piston occurs prior to movement of the brake piston in a manner similar to the structure described hereinbefore.

It will be appreciated that usually a pair, at least, of bolts or similar means are provided at circumferentially spaced parts of a brake for positioning carrier plates in the brake. Normally one auxiliary piston or carrier plate actuator will be associated with each of such bolts at a radially inner part of the carrier plate in each embodiment of the invention disclosed herein. Other energization means may be provided for the auxiliary pistons but preferably they connect to the regular brake energization system, and in all events would be actuated simultaneously with the brake actuation means.

From the foregoing, it will be seen that a novel brake has been provided, which brake is adapted to maintain a center carrier plate in a position normal to the transverse axis of the brake. Thus the brake would have uniform wear of the brake linings on a surface parallel to the carrier plate. The construction shown in Fig. 3 can be readily adapted to a brake having more than two carrier plates by the provision of an additional telescoping tubular piston provided in the compound auxiliary piston for each additional carrier plate to engage with such plate. These compound auxiliary pistons may extend through slots or edge recessed portions of the carrier plates, if desired. Hence the brake of the invention is adapted for use with any number of carrier plates and the objects of the invention are achieved in the brakes constructed in accordance with the invention.

While certain representative embodiments and details have been shown for the purpose of illustrating the invention, it will be apparent to those skilled in this art that various changes and modifications may be made therein without departure from the spirit or scope of the invention.

What I claim is:

1. A brake comprising a brake housing, a center carrier plate, brake lining means positioned on said carrier plate and being movable therewith, means extending transversely of said brake housing and securing said carrier plate to same for movement along the transverse axis thereof, said carrier plate being positioned in a plane normal to the transverse axis of the brake, brake disc means positioned on opposite sides of said carrier plate and also being movable parallel to the axis of the brake in a plane normal thereto, piston means for forcing said brake discs and said carrier plate transversely of said brake housing to engage said brake lining means, an auxiliary piston member for engaging said carrier plate for urging it transversely of said brake housing, means for setting up operative clearance between said brake disc means and said brake lining means for non-actuated operation of the brake, means for simultaneously energizing said piston means and said auxiliary piston member, and a restraining member for said piston means to permit movement of said auxiliary piston member before movement of said piston means upon energization of said piston means and said auxiliary piston member.

2. A brake comprising a brake housing, a center carrier plate, brake lining means positioned on said carrier plate and being movable therewith, means securing said carrier plate to said brake housing for movement along the transverse axis thereof, said carrier plate being positioned in a plane normal to the transverse axis of the brake, brake disc means positioned on opposite sides of said carrier plate and also being movable parallel to the axis of the brake, means for setting up operative clearance between said brake disc means and said brake lining means for non-actuated operation of the brake, means for forcing said brake discs and said carrier plate transversely of said brake housing to engage said brake lining means, an auxiliary piston member for engaging a portion of said carrier plate for moving it transversely of said brake housing, and means for actuating said piston means and said auxiliary piston member.

3. A brake comprising a brake housing, a center carrier plate, brake block means positioned on opposed faces of said carrier plate and being movable therewith, bolt means extending transversely of said brake housing and securing said carrier plate to same for movement along the transverse axis thereof, said carrier plate being positioned in a plane normal to the transverse axis of the brake, brake discs positioned on opposite sides of said carrier plate and also being movable parallel to the axis of the brake, said brake discs being adapted to engage a wheel for rotation therewith, brake operation means for forcing said brake discs and said carrier plate transversely of said brake housing to engage said brake block means, and an auxiliary piston member in said brake housing for engaging said carrier plate for aiding in moving it transversely of said brake housing upon actuation of the brake.

4. In a spot type of a brake, a brake housing, a center carrier plate received in said brake housing for sliding movement transversely thereof, said center carrier plate being positioned in a plane extending normally with relation to the transverse axis of the brake, an auxiliary piston slidably received in said brake housing for bearing on said center carrier plate, means for actuating said auxiliary piston to move same into contact with said carrier plate upon brake actuation to move said carrier plate transversely of the brake, and brake actuation means for contacting a radially outer portion of said center carrier plate with relation to the portion thereof contacted by said auxiliary piston, said auxiliary piston being moved an instant prior to production of a braking action in the brake.

5. In a spot type of a brake, a brake housing, a center carrier plate received in said brake housing for sliding movement transversely thereof, said center carrier plate being positioned in a plane extending normally with relation to the transverse axis of the brake, piston means for brake actuation, an auxiliary piston slidably received in said brake housing and spaced radially from said piston means for contacting said center carrier plate, and means for actuating said auxiliary piston to move same into contact with said carrier plate upon brake actuation to move same transversely of the brake.

6. In a spot type of a brake, a brake housing, a center carrier plate received in said brake housing for sliding movement transversely thereof, a piston for brake actuation, an auxiliary piston slidably received in said brake housing for bearing on said carrier plate, means for retarding movement of said first named piston momentarily on brake energization, and means for actuating said auxiliary piston to move same into pressure contact with said carrier plate immediately upon brake actuation.

7. A brake as in claim 5 wherein said auxiliary piston includes a tubular piston having a cylindrical piston slidably received therein for movement in the same direction as said tubular piston, and a pair of carrier plates are provided with each one of said pistons being adapted to contact different carrier plates and move such plates in the same direction.

8. A brake as in claim 7 wherein said tubular piston has two open ends, and said tubular piston and said cylindrical piston are of equal effective areas and are controlled by a common pressure source.

9. In a spot type of a brake, a brake housing, three brake discs engageable with a wheel for axial movement with relation thereto, a pair of center carrier plates positioned intermediate said brake discs, said center carrier plates having radially inwardly offset lug portions provided thereon with one of said lug portions having an aperture provided therein, an auxiliary piston slidably engaged with said brake housing on a portion thereof adjacent said apertured center carrier plate, said auxiliary piston including a tubular piston with a cylindrical piston slidably received in the bore of said tubular piston, said tubular piston being adapted to engage said apertured lug on said center carrier plate immediately adjacent said aperture therein with said cylindrical piston being adapted to extend through said aperture and engage said lug on said second center carrier plate, said tubular piston and said cylindrical piston being of substantially equal effective areas, and means for applying hydraulic pressure to said tubular piston and said cylindrical piston upon brake actuation.

10. In a spot type of a brake, a brake housing, at least three brake discs engageable with a wheel for axial movement with relation thereto, at least a pair of center carrier plates individually positioned intermediate adjacent pairs of said brake discs, said center carrier plates having radially inward portions provided thereon with one of said portions having an aperture provided therein, an auxiliary piston slidably engaged with said brake housing, said auxiliary piston including a tubular piston with a cylindrical piston slidably received in the bore of said tubular piston, said tubular piston being adapted to engage the said apertured center carrier plate immediately adjacent said aperture therein, said cylindrical piston being adapted to extend through said aperture and engage said second center carrier plate, and means for setting up operative pressures on said pistons.

11. In a brake, a center carrier plate, brake linings on said carrier plate, a brake disc, means positioning said carrier plate for movement along the axis of the brake, means for moving said carrier plate axially of the brake upon brake actuation, a piston for engaging said carrier plate radially inwardly of said carrier plate movement means, and means for actuating said piston upon actuation of the brake.

12. In a brake, a center carrier plate, brake linings on said carrier plate, a brake disc, means positioning said carrier plate for movement along the axis of the brake and at least a pair of pistons positioned at different radial distances from the brake centerline for engaging said carrier plate on brake actuation and moving same axially of the brake.

13. In a brake, a center carrier plate, brake linings on said carrier plate, a brake disc, means positioning said carrier plate for movement along the axis of the brake, a series of circumferentially spaced brake actuation pistons for moving said carrier plate axially on brake actuation, means for retarding action of said pistons, and piston means positioned at different radial distances from the brake centerline with relation to said first-named pistons for moving said carrier plate axially immediately upon brake actuation.

14. In a spot type of a brake, a brake housing, at least three brake discs engageable with a wheel for axial movement with relation thereto, at least a pair of center carrier plates individually positioned intermediate adjacent pairs of said brake discs, an auxiliary piston slidably engaged with said brake housing, said auxiliary piston including an open ended tubular piston with a cylindrical piston slidably received in the bore of said tubular piston, said tubular piston for movement in the same direction as said tubular piston being adapted to engage one of said center carrier plates, said cylindrical piston being adapted to engage said second center carrier plate, and means for setting up operative pressures on said pistons.

References Cited in the file of this patent

UNITED STATES PATENTS

| | | |
|---|---|---|
| 2,084,216 | Poage et al. | June 15, 1937 |
| 2,115,083 | Pierce | Apr. 26, 1938 |
| 2,356,258 | Martin | Aug. 22, 1944 |
| 2,497,438 | Butler | Feb. 14, 1950 |
| 2,611,453 | Vaughn | Sept. 23, 1952 |